June 6, 1933. E. HUBBARD 1,912,481
NONSKID ATTACHMENT
Filed Nov. 28, 1932
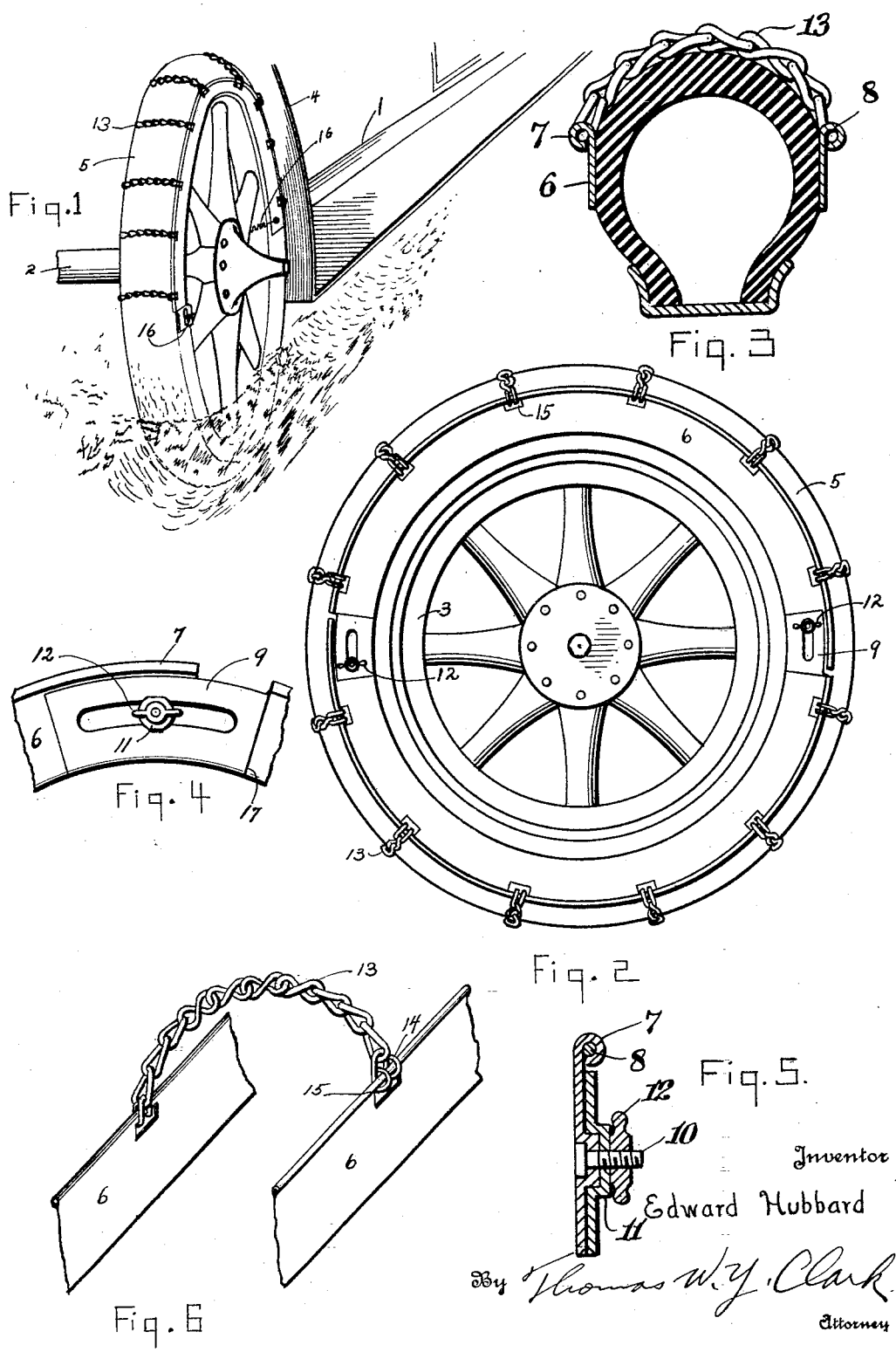
Inventor
Edward Hubbard
By Thomas W. J. Clark
Attorney Patented June 6, 1933

1,912,481

UNITED STATES PATENT OFFICE

EDWARD HUBBARD, OF BALTIMORE, MARYLAND

NONSKID ATTACHMENT

Application filed November 28, 1932. Serial No. 644,714.

My invention relates to a non-skid attachment for vehicle wheels and its objects are to make such an attachment which will be very light, and yet strong enough to withstand the hardest wear, to make one which will wear the tires the least and use as short traction members as possible, to make one which any one may put on with a minimum of effort and in any road condition.

I attain these and other objects and advantages by the attachment illustrated in the accompanying drawing, in which:

Figure 1 shows half the attachment applied to an automobile wheel in getting out of a very bad hole.

Fig. 2 is a front elevation of the attachment applied to a vehicle wheel.

Fig. 3 is a cross-sectional view of the attachment on a tire.

Fig. 4 is a fragmentary detailed view of the attaching means for the sections of the attachment.

Fig. 5 is a cross-sectional view of the parts shown in Fig. 4.

Fig. 6 is a fragmentary perspective view of the traction members, showing how they are attached to the annular members.

Similar numerals refer to similar parts throughout the several views.

Automobile 1 has an axle 2 carrying a wheel 3. Mud guard 4 of the automobile covers this wheel. The wheel has pneumatic tire 5 thereon. On each side of the tire are semiannular plates 6, made preferably of sheet metal. The outer edge of these plates is curled into a bead 7 and this bead encloses a wire ring 8, half on each plate. Each semiannular plate is symmetrical and has a countersunk square bolt head hole in one end, and a slotted attaching portion 9 at the other end. A bolt 10 passes through the hole provided for it in the plate end, and the countersunk hole prevents its rotation. The slot in the slotted portion may be wide enough to go over the struck-up portion, as shown in Fig. 5, in which case a washer 11 has sides bent over the struck-up portion as shown in Fig. 5 to securely hold the slotted portion on the bolt portion when wing nut 12 is tightened on the bolt 10. The long slots allow some variation in size of the assembled plates for variations in air in the tire and also would allow some sliding contraction of the plates. Of course, the attachment fits over the tire sufficiently loosely to allow some vertical and circumferential sliding.

Several partly twisted link chains 13 having hooks 14 at their ends pass over the tread of the tire, and the hooks pass through apertures 15 in the plates, near the outer edge, and around the wire enclosed beaded portion, thus giving a light, reasonably rigid side plate and a very strong hold for the chains. The use of partly twisted link chain gives good traction on the road and little wear on the tire. Also the fact that the chains do not have to go around the tire, but simply across the tread, will give less wear on the sides of the tire and a shorter chain may be used and there is less danger of the chains striking the mud guard 4 with short chains. This short chain structure, with the plates at the widest part of the tire, also permits the outer rim of the plate to itself help serve as a non-skid element, and this is especially true with the end hooked links, when they strike the road. The plates also aid in preventing side slipping.

The semiannular structure is very useful in assembly, because, should the automobile be stalled in deep mud or sand, as shown in Fig. 1, one-half of the attachment may be put on and the light partially flexible structure of the plates allows one to be put back between the tire and mud guard without difficulty. This half of the attachment may be held in place by hooked wire springs 16 fastening over a bolt and in a slot at the ends of the semi-annular plates. The car may then be moved forward, the other half of the attachment put on and the two bolted together, and then the springs 16 may be removed.

The slotted end portion of the plates may be offset slightly, if desired, as shown at 17.

The semi-rigid structure of the side plates, the traction member holders, makes them much more easily handled than the usual chains, and also the lightness of the sheet metal, coupled with the strength of the enclosed wire ring sections, makes the plates far superior to cast metal sections sometimes suggested. The relatively large diameter plate, with the outer edge near the tread, makes possible the use of shorter traction chains, with the advantages hereinbefore set forth.

The attachment herein shown and described is capable of considerable modification without departing from the scope of my invention.

What I claim as new and desire to secure by Letters Patent is:

1. In a non-skid attachment for vehicle wheels a pair of annular sheet metal members adapted to overlie a vehicle tire, one on each side, and at substantially the widest section thereof, the outer edge of said members being curled to form a bead, a ring in said bead and apertures in said members, chain traction members extending across the tire tread and fastening through said apertures and around said bead and ring.

2. In a non-skid attachment for vehicle wheels, a pair of radially semiannularly sectioned sheet metal annular members adapted to overlie a vehicle tire, one on each side and at substantially the widest section thereof, the outer edge of said members being curled to form a bead, ring sections in said bead and apertures in said members, traction members extending across the tire tread and fastening through said apertures and around said bead and ring and means to detachably connect the parts of each annular member together.

EDWARD HUBBARD.